C. L. GILPATRICK.
Butter Worker.
No. 39,808. Patented Sept. 8. 1863.
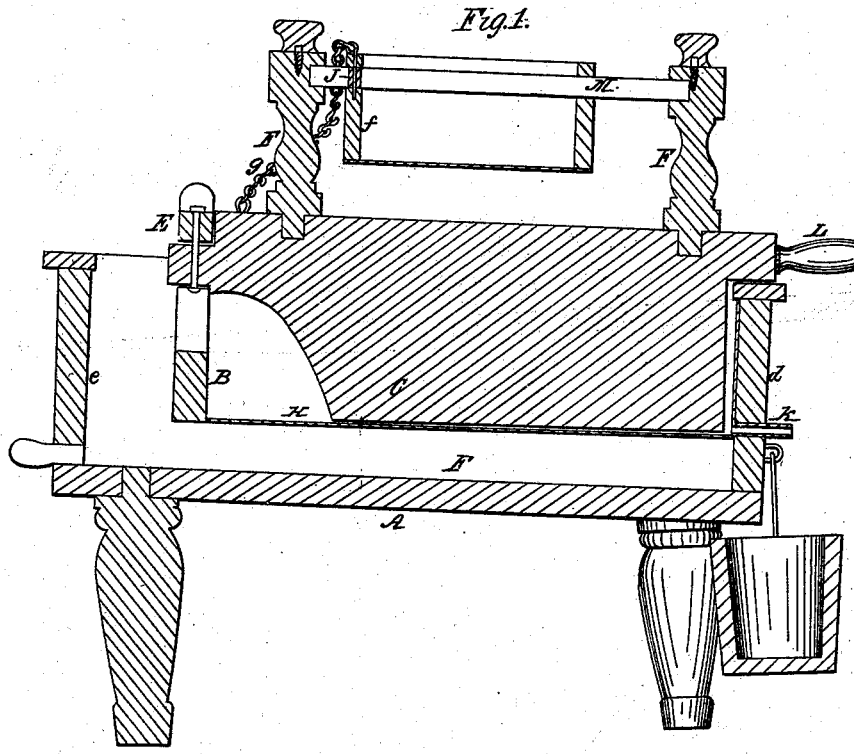
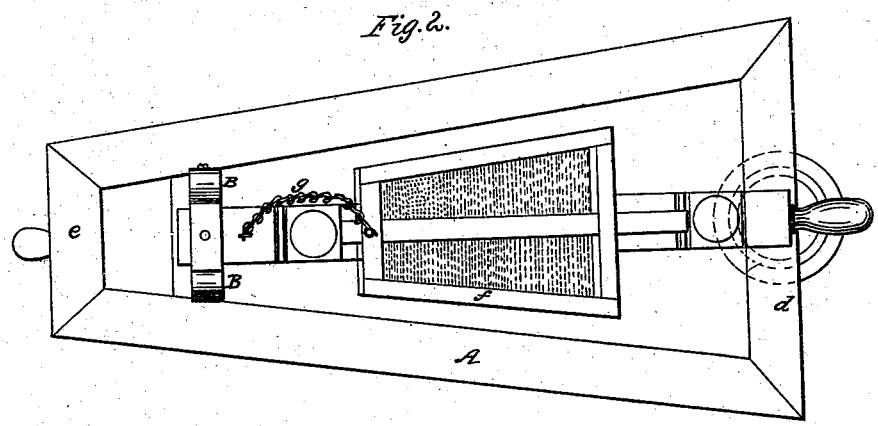
Witnesses:
Charles Alexander
J. H. Schenck
Inventor:
C. L. Gilpatrick
per C. M. Alexander

UNITED STATES PATENT OFFICE.

C. L. GILPATRIC, OF LEWISTON, MAINE.

IMPROVEMENT IN BUTTER-WORKERS.

Specification forming part of Letters Patent No. 39,808, dated September 8, 1863.

*To all whom it may concern:*

Be it known that I, C. L. GILPATRIC, of Lewiston, in the State of Maine, have invented certain new and useful Improvements in Butter-Workers; and I hereby declare that the following is a true and exact description of the same, reference being had to the accompanying drawings, and to the letters of reference marked thereon.

Figure 1 represents the body or frame of my machine, which is further designated by the letter A.

The frame A may be made a foot (more or less) in width at the end marked d, and half that width at the end marked e. The length of frame A may be double the width of end d. The frame A is supported by three legs, two being inserted in the end d and one in the end e, those at d being a little shorter than the one at e, so as to give frame A and zinc box H a slight inclination in the direction of the spout K.

B represents a thick board fitting in grooves in the inner sides of frame A in a vertical position and parallel with the end e, and so arranged that it, with worker C, can be readily removed or detached whenever necessary. A sufficient space is left between board B and the end e to introduce water or ice into the cavity F underneath the zinc lining H. The board B is made forked at its upper end, to allow one end of the worker C to play as hereinafter described.

E represents a cross-bar extending horizontally from one prong or standard of B to the other. Bar E rests upon its bearings at its ends in B, and worker C is attached to its under side by a bolt.

The letter H represents the zinc box or lining of the interior of the frame A.

The worker C is constructed with a shoulder at its upper edge, which rests on the top of end d, and to this shoulder the handle L is fastened that operates the machine.

f in Fig. 2 represents the box into which the butter is first placed when received from the churn. The box f is suspended in a horizontal position on the shaft M and lengthwise of the frame A. The box f is about one-third of the length of frame A, and of a depth and width corresponding to its length. The bottom of box f consists of fine wire-cloth or of a metallic plate perforated with small holes. The shaft M, upon which box f is suspended, has its bearings in the uprights F, framed into the top of C. The box f is held in position by the pin j, which is inserted into a hole made to receive it in the end of box f and through the shaft M. To prevent the pin j from being misplaced, it is attached to the chain g, the opposite end of g being fastened to the top of worker C. When the milk is sufficiently drained from the butter in box f, the pin j is removed, the box f inverted, and the butter emptied into the zinc box H. The next operation consists in giving a reciprocating motion to worker C by means of the handle, and by pressing the butter against the sides of zinc box H separating the remainder of the milk from it.

It will be seen that by my arrangement most of the milk will be separated from the butter by the sieve at the bottom of box f, thus leaving less to be done by worker C, and that the process of collecting the butter will be expedited by the ice or cold water immediately under the zincbox H.

Having thus described my invention, what I claim, and desire to secure by Letters Patent, is—

The combination of the worker C and box f with the box A, provided with the zinc lining and water-chamber F, all constructed and arranged in the manner and for the purpose set forth.

C. L. GILPATRIC.

Witnesses:
T. A. D. FESSENDEN,
W. R. FRYE.